US011232589B2

(12) United States Patent
Yano et al.

(10) Patent No.: US 11,232,589 B2
(45) Date of Patent: Jan. 25, 2022

(54) OBJECT RECOGNITION DEVICE AND OBJECT RECOGNITION METHOD (71) Applicant: HITACHI, LTD., Tokyo (JP)

(72) Inventors: Taiki Yano, Tokyo (JP); Nobutaka Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 161 days.

(21) Appl. No.: 16/721,521

(22) Filed: Dec. 19, 2019

(65) Prior Publication Data
US 2020/0211221 A1 Jul. 2, 2020

(30) Foreign Application Priority Data

Dec. 26, 2018 (JP) .............................. JP2018-243432

(51) Int. Cl.
*G06K 9/46* (2006.01)
*G06T 7/73* (2017.01)
(Continued)

(52) U.S. Cl.
CPC .............. *G06T 7/74* (2017.01); *G06K 9/6215* (2013.01); *G06T 7/0002* (2013.01); *G06T 7/60* (2013.01);
(Continued)

(58) Field of Classification Search
CPC ........... G06T 7/74; G06T 7/0002; G06T 7/60; G06T 2200/04; G06T 2207/20056; G06K 9/6215; G06K 2009/6213
See application file for complete search history.

(56) References Cited

U.S. PATENT DOCUMENTS 10,207,409 B2 * 2/2019 Odagiri ..................... G06K 9/48
2014/0079286 A1 * 3/2014 Lee ........................ G06K 9/685
382/103

(Continued)

FOREIGN PATENT DOCUMENTS

JP       2005-346287 A        12/2005
JP       2005346287 A    *    12/2005
WO   WO-2013029674 A1  *    3/2013    ........... G06K 9/6202

OTHER PUBLICATIONS

Trademark detection using SIFT features matching., Ashwini D Narhare et al., IEEE, 978-1-4799-3, 2015, pp. 684-688 (Year: 2015).*

(Continued)

*Primary Examiner* — Jayesh A Patel
(74) *Attorney, Agent, or Firm* — Volpe Koenig (57) ABSTRACT An object recognition device includes: a data holding unit that stores a reference image of an object of a recognition candidate, each feature point in the reference image, and a feature quantity at each feature point; an image acquisition unit acquires a scene image that is an image of a recognition processing target; a definition calculation unit detects definition indicating the degree of sharpness in each region of the scene image; and a feature acquisition unit and a matching calculation unit that detect a feature point in the scene image to perform a process of matching with the feature point. The matching calculation unit executes, by different methods, an extraction method of feature points in a first region of the scene image where the definition is a first range and in a second region of the scene image where the definition is a second range lower than the first range.

9 Claims, 6 Drawing Sheets (51) Int. Cl.
*G06T 7/00* (2017.01)
*G06T 7/60* (2017.01)
*G06K 9/62* (2006.01)

(52) U.S. Cl.
CPC .. *G06K 2009/6213* (2013.01); *G06T 2200/04* (2013.01); *G06T 2207/20056* (2013.01)

(56) References Cited

U.S. PATENT DOCUMENTS

2014/0193074 A1\* 7/2014 Huang ................. G06K 9/4676
382/180
2015/0269735 A1\* 9/2015 Tateno ................. G06K 9/4609
382/153

OTHER PUBLICATIONS

Determining the Dry Parameter of Fingerprint Image Using Clarity Score and Ridge-valley Thickness Ratio, Rahmat Syam et al., IAENG, Nov. 12, 2011, pp. 1-9 (Year: 2011).\*

\* cited by examiner

OBJECT RECOGNITION DEVICE AND OBJECT RECOGNITION METHOD

BACKGROUND

The present invention relates to an object recognition device that recognizes an object in an image and an object recognition method.

The automation of picking work and assembling work of an object has been desired in manufacturing and logistics fields. In order to automate these work, a robot is used. In the case where a work object is handled using a robot, means for measuring the position and posture of the work object is necessary. Therefore, a visual sensor is used.

In order to allow a robot to carry out the work of handling an object, it is necessary to recognize the type of object measured by a visual sensor.

An object is recognized in such a manner that, for example, the object in a work area is measured by a camera, and the measurement result is verified with a preliminarily-prepared target model. For example, when the object is measured in the work area, there is a risk that light or a shadow of illumination is reflected in the measurement result. If light or a shadow of illumination is reflected in the measurement result as described above, there is a risk that a difference between a model and the measurement result is increased and the recognition of the object fails.

For this problem, Japanese Unexamined Patent Application Publication No. 2005-346287 discloses a technique in which reference data for each of plural reference images having different definition of predetermined objects is preliminarily prepared, and one of the pieces of reference data in accordance with the definition of a partial region image is selected to determine whether or not the predetermined object is shown in the partial region image.

SUMMARY

In Japanese Unexamined Patent Application Publication No. 2005-346287, it is determined whether or not the predetermined object is shown by comparison using an image in accordance with definition. However, in the case where this technique is applied to feature point matching, if, for example, an image having low definition is used, there is a risk that the recognition accuracy of an object is deteriorated.

The present invention has been made in view of the above-described circumstances, and an object thereof is to provide a technique capable of appropriately recognizing an object irrespective of the influence of surrounding environments.

In order to achieve the above-described object, according to one aspect of the present invention, provided is an object recognition device for recognizing an object that includes: a storage unit that stores a reference image of an object of a recognition candidate, each feature point in the reference image, and a feature quantity at each feature point; an image acquisition unit that acquires a scene image that is an image of a recognition processing target; a definition calculation unit that detects definition indicating the degree of sharpness in each region of the scene image acquired by the image acquisition unit; and a matching calculation unit that detects a feature point in the scene image to perform a process of matching with the feature point. The matching calculation unit executes, by different methods, at least one of an extraction method of feature points in a first region of the scene image where the definition is a first range and in a second region of the scene image where the definition is a second range lower than the first range and a detection method of feature quantities in the first region and the second region.

According to the present invention, it is possible to appropriately recognize an object irrespective of the influence of surrounding environments.

DETAILED DESCRIPTION

Hereinafter, embodiments of the present invention will be described on the basis of the drawings. In the embodiments, for example, a reference image (model image) of an object of a recognition candidate and the feature quantity of each unit region (region of one or more pixels) in the model image are stored while being associated with each other, a scene image that is an image as a recognition processing target is acquired, definition indicating the degree of sharpness in each unit region of the acquired scene image is detected, feature points in the model image and the scene image are detected to perform a process of matching the feature points, and detection of the feature points in a first region of the scene image where the definition is a first range and detection of the feature points in a second region of the scene image where the definition is a second range lower than the first range is executed by different methods.

Here, the definition indicates the degree of sharpness of an image, and may be, for example, values and the like shown in the following (1) to (4).

(1) The definition of the unit region may be the magnitude of a luminance gradient in a pixel in the unit region or the maximum unique value of the Hessian matrix. In addition, the definition of the unit region may be the magnitude of a luminance gradient in a pixel group including pixels in the unit region and surrounding regions or the maximum value of the maximum unique value of the Hessian matrix.

(2) The definition of the unit region may be luminance dispersion or standard deviation in the unit region.

(3) The definition of a preliminarily-defined unit region (for example, a grid-like divided region) may be a value (refer to Japanese Unexamined Patent Application Publication No. 2005-346287) calculated from spatial frequency distribution obtained by performing two-dimensional Fourier transformation for the unit region.

(4) The definition of the unit region may be the number of feature points detected by a specific feature point detection method (ORB (Oriented FAST and Rotated BRIEF) or the like) in the unit region.

In addition, the difference in the detection method of the feature point may include, for example, a difference in a process itself for detecting the feature point and a difference in the type of feature quantity used in the method of detecting the feature point.

The object recognition device according to such embodiments can be expressed as an object recognition device for recognizing an object that includes: a storage unit that stores a reference image of an object of a recognition candidate, each feature point in the reference image, and a feature quantity at each feature point; an image acquisition unit that acquires a scene image that is an image of a recognition processing target; a definition calculation unit that detects definition indicating the degree of sharpness in each region of the scene image acquired by the image acquisition unit; and a matching calculation unit that detects a feature point in the scene image to perform a process of matching with the feature point. The matching calculation unit executes, by different methods, at least one of an extraction method of feature points in a first region of the scene image where the definition is a first range and in a second region of the scene image where the definition is a second range lower than the first range and a detection method of feature quantities in the first region and the second region.

According to the object recognition device of each embodiment, feature point matching can be performed by detecting a feature point suitable for a region of an image in accordance with the definition of the image, or feature point matching can be performed by detecting a feature quantity suitable for the region. Thus, the accuracy of object recognition by the feature point matching can be improved. Therefore, the feature point matching can be appropriately performed for a whitened region of a scene image where illumination is reflected or a blackened region where a shadow is reflected, and the accuracy of object recognition can be improved.

First Embodiment

Figure 1:
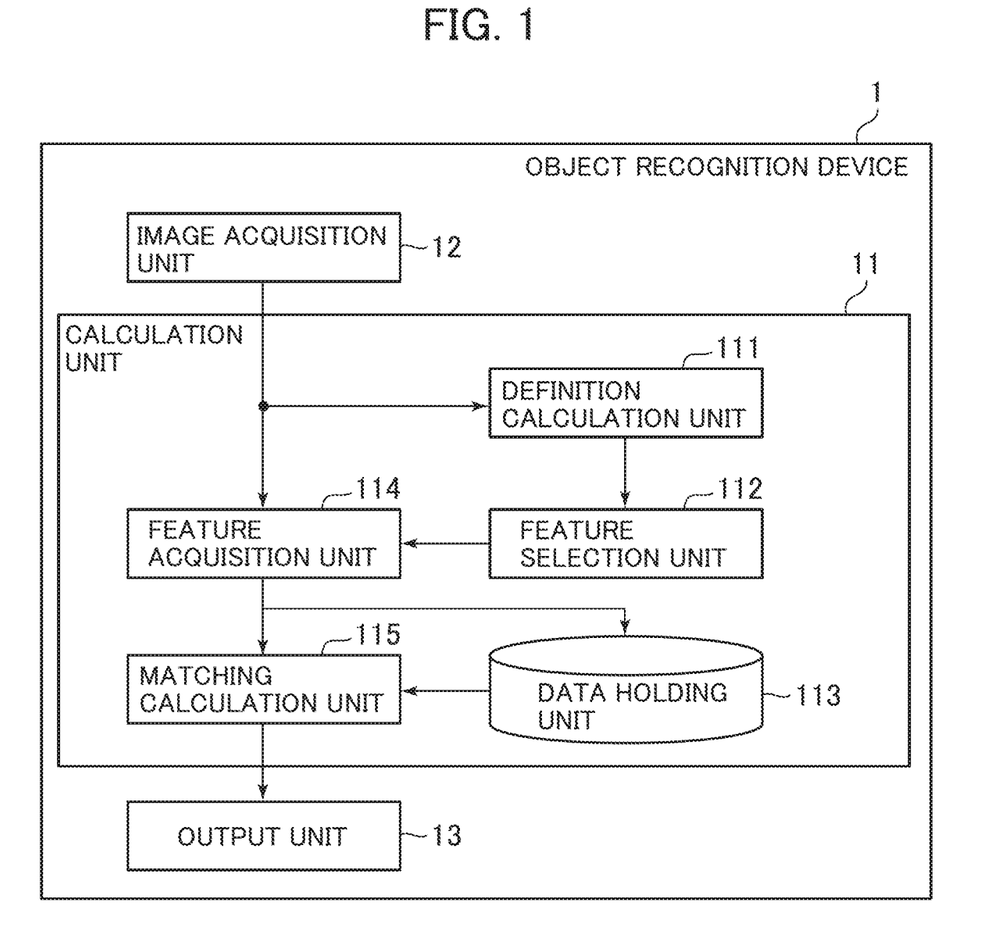
FIG. 1 is a block diagram for showing a functional configuration of an object recognition device.

A first embodiment will be described using FIG. 1 to FIGS. 6A to 6C. FIG. 1 is a block diagram for showing a functional configuration of an object recognition device. An object recognition device 1 includes, for example, a calculation unit 11 that performs a calculation process to be described later, an image acquisition unit 12, and an output unit 13 that outputs a recognition result. The image acquisition unit 12 acquires data of an image (scene image) that is a target for a process of determining whether or not an object of a recognition candidate is present. The data of the scene image contains information that can identify plural kinds of feature quantities. For example, the data of the scene image may contain luminance information of each pixel, and three-dimensional coordinate information (an example of three-dimensional position information) to each pixel with respect to a viewpoint. The scene image contains an object of a determination candidate in some cases. As an object, there is, for example, a part handled in each manufacturing industry, a product handled in the logistics industry, or the like.

The calculation unit 11 includes, for example, a definition calculation unit 111, a feature selection unit 112, a data holding unit 113 as an example of a storage unit, a feature acquisition unit 114, and a matching calculation unit 115.

Here, a matching calculation unit in claims includes the feature acquisition unit 114 in the embodiment.

The data holding unit 113 holds in a storage device 101 (see FIG. 3) data (data of an image (model image) of a reference object) related to plural kinds of reference objects acquired in advance. The reference object can be also referred to as a teaching object. The image of the reference object serving as a recognition candidate is registered in the object recognition device 1 in advance. The data related to the reference object contains data of a feature point (coordinates of a feature point) related to the reference object and plural kinds of feature quantities at the feature point. The feature point related to the reference object may be a feature point extracted in each of plural kinds of feature point extraction methods. As the feature point extraction method, for example, SIFT (Scale Invariant Feature Transform), ORB, or the like may be used. As the plural kinds of feature quantities may be one or more of a feature quantity (for example, an SIFT feature quantity) that is high in expressing capability, a feature quantity (for example, a local binary pattern (LBP)) that is high in the degree of robustness, and a feature quantity (for example, a pixel position or a normal line) that is not affected by illumination conditions.

The definition calculation unit 111 calculates the definition of each unit region in the scene image acquired by the image acquisition unit 12. In the embodiment, each unit region is assumed as one pixel, and the definition thereof is assumed as the magnitude of a luminance gradient in the pixel. In the embodiment, the definition of, for example, a region where illumination is reflected or a region where a shadow is reflected is calculated as a small value.

The feature selection unit 112 identifies that each region of the scene image is any one of a region where the definition is high, a region where the definition is medium, and a region where the definition is low on the basis of the definition of each unit region calculated by the definition calculation unit 111. The feature quantity used for the region where the definition is high is set as a feature quantity (for example, SIFT feature quantity: feature quantity for high definition) that is high in expressing capability, the feature quantity used for the region where the definition is medium is set as a feature quantity (for example, LBP: feature quantity for medium definition) that is high in the degree of robustness, and the feature quantity used for the region where the definition is low is set as a feature quantity (a three-dimensional coordinate position, a normal line, or the like: feature quantity for low definition) that is not affected by illumination conditions. It should be noted that each region of the scene image is identified as any one of the region where the definition is high, the region where the definition is medium, and the region where the definition is low using a fixed threshold value in the embodiment, and thus there is a possibility that there is no unit region identified as any one of the regions in the scene image.

The feature acquisition unit 114 extracts (calculates) a feature point from the data of the scene image acquired by the image acquisition unit 12 using a predetermined feature point extraction method, and acquires (calculates) a feature quantity selected for each feature point. Accordingly, an appropriate feature quantity selected in accordance with the definition of each unit region is acquired for each feature point from the scene image. It should be noted that the feature acquisition unit 114 may switch the feature point extraction method of extracting a feature point from the scene image on the basis of the definition of each unit region calculated by the definition calculation unit 111. For example, the feature acquisition unit 114 may extract a feature point using the SIFT in the region where the definition is high, and may use the ORB in the region where the definition is not high. Thereby, an appropriate feature point can be extracted from the scene image in accordance with the definition of each unit region.

The matching calculation unit 15 performs a process of matching feature points on the basis of the feature quantity and the feature point of the scene image acquired by the feature acquisition unit 114 and the feature quantity and the feature point of the model image of the data holding unit 113, and calculates the similarity between the scene image and the model image. Then, the matching calculation unit 15 determines a result of the process of matching on the basis of the similarity, and passes the determination result to the output unit 13. In the embodiment, the matching calculation unit 15 switches the feature quantity of the model image to be compared in accordance with the definition of a region to which the feature point of the scene image belongs. Specifically, the matching calculation unit 15 performs the process of matching the feature point in the region of the scene image where the definition is high with the feature point on the basis of the feature quantity for high definition for the model image, performs the process of matching the feature point in the region of the scene image where the definition is medium with the feature point on the basis of the feature quantity for medium definition for the model image, and performs the process of matching the feature point in the region of the scene image where the definition is low with the feature point on the basis of the feature quantity for low definition for the model image. In this case, for each feature point of the model image, the feature point of the scene image having the feature quantity closest to that of the feature point of the model image may be associated. As described above, the feature quantity of the model image as a matching target is switched in accordance with the definition in the scene image. Thus, the process of matching the feature points can be appropriately performed in accordance with a state of each unit region, and the matching accuracy of the feature points can be improved. The similarity obtained by the matching process may be, for example, the number of or the ratio of correctly-matched feature points.

Here, there is a possibility that wrong correspondence is included in the matching process in which the feature points having the closest feature quantity are associated with each other. Thus, the matching accuracy may be improved by executing the following processes (A) to (C) in the matching calculation unit 15.

(A) Among plural sets of the feature points (model feature points) of the model image and the feature points (scene feature points) of the scene image that are associated with each other on the basis of the feature quantities, several sets are randomly selected, and a transformation matrix (candidate transformation matrix) shown in the following equation (1) is acquired on the basis of the selected sets.

$$Xs=RXm+T \quad (1)$$

wherein Xs represents coordinates of the feature point of the scene image, Xm represents coordinates of the feature point of the model image, R represents a rotation matrix, and T represents a translation matrix.

The transformation matrix is a matrix that indicates the position of the scene feature point associated with the model feature point.

(B) All the model feature points are transformed by the transformation matrix obtained in (A) to identify the corresponding position in the scene image for each model feature point, and a geometric distance between the identified corresponding position and the position of the scene feature point that makes a set with each model feature point is calculated. In the case where the distance is equal to or smaller than a predetermined threshold value, the set of the model feature point and the scene feature point is determined as a correctly-associated set, and the number of correctly-associated sets is counted.

(C) The transformation matrix acquired in the case where the number of correctly-associated sets is the largest by repeatedly executing the processes (A) and (B) is identified as the optimum transformation matrix. In addition, if the total number in the case where the number of correctly-associated sets is the largest is equal to or larger than a predetermined threshold value, it is determined that an object of the model image is present in the scene image (presence of object). If the total number is smaller than the threshold value, it is determined that an object of the model image is not present in the scene image (absence of object).

Figure 2:
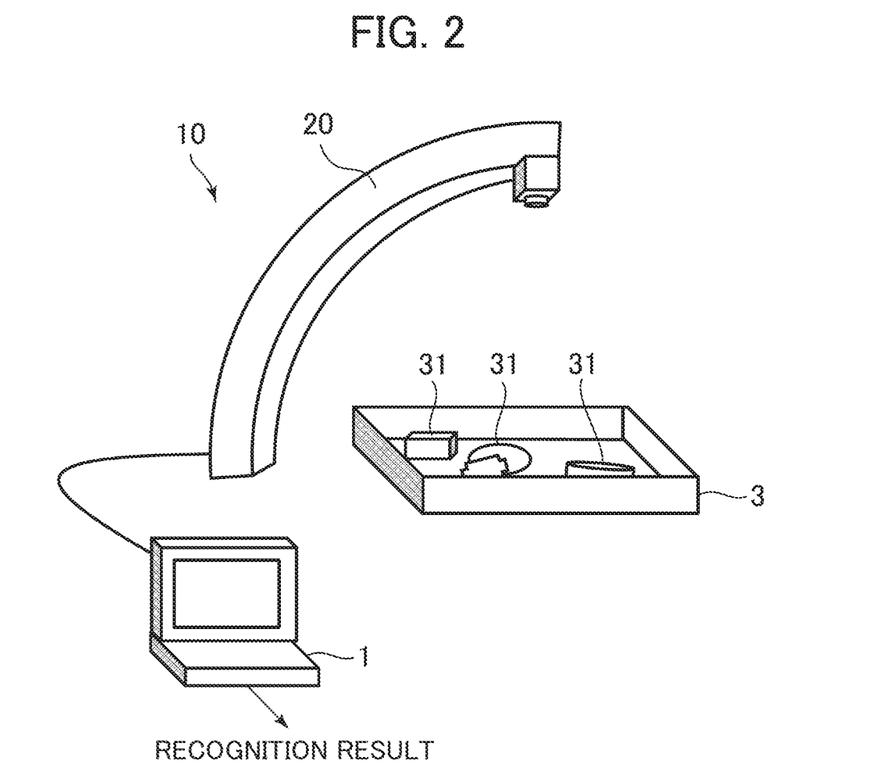
FIG. 2 is an explanatory diagram for showing an example of application of the object recognition device.

FIG. 2 shows an appearance example in the case where the object recognition device 1 is applied to an automatic sorting machine 10. Objects 31 as recognition targets (identification targets) are conveyed while being stored in a container 3 such as a palette. A camera 2 is attached above the container 3 through an arm 20. The camera 2 is, for example, an imaging device having an imaging element such as a CCD (Charge Coupled Device) camera or a CMOS camera. In the embodiment, the camera 2 is provided with, for example, a ranging sensor that measures a three-dimensional distance from the viewpoint of the camera 2 to each part to be imaged. Image data photographed by the camera 2 is sent to the object recognition device 1. It should be noted that the image data may contain data of the three-dimensional distance to each part measured by the ranging sensor. The image acquisition unit 12 of the object recognition device 1 acquires the image data from the camera 2, and sends the same to the calculation unit 11.

The object recognition device 1 can be realized by using a personal computer. As will be described later using FIG. 3, the object recognition device 1 can be realized by storing a predetermined computer program in a general purpose computer and executing the same. Alternatively, the object recognition device 1 may be configured as a dedicated device.

A recognition result of the object recognition device 1 is sent to, for example, a robot control device (not shown), and an object recognized as a specific object is taken out by a robot or the like to be placed at a predetermined place.

Figure 3:
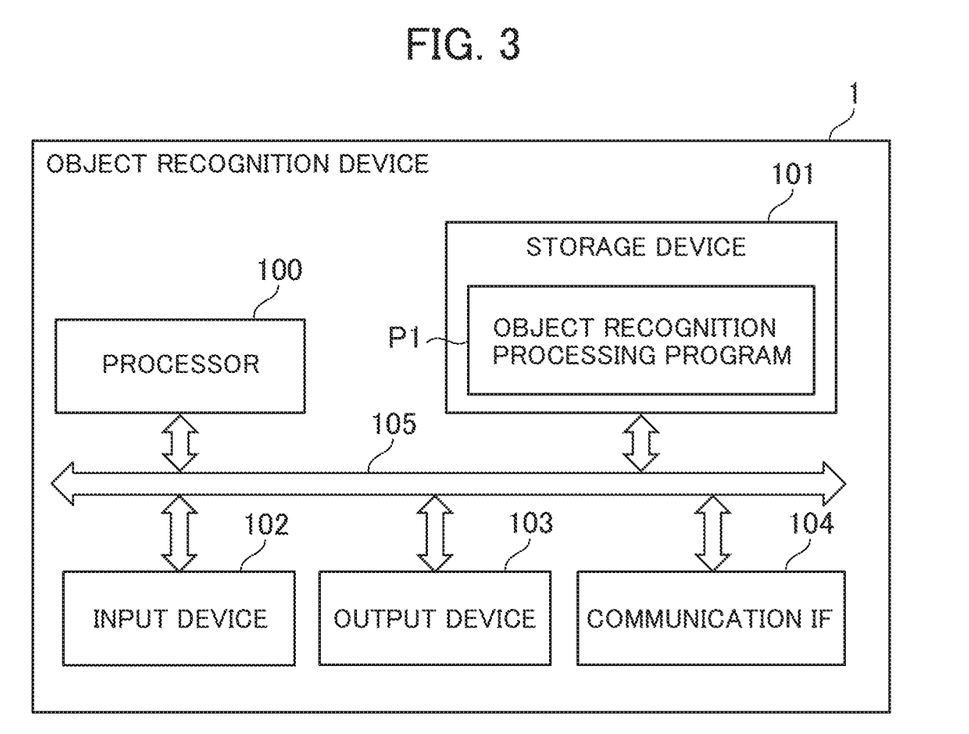
FIG. 3 is a block diagram for showing a hardware configuration of the object recognition device.

FIG. 3 shows a hardware configuration example of the object recognition device 1. The object recognition device 1 has, for example, a processor 100, a storage device 101, an input device 102, an output device 103, and a communication interface (communication IF 104). The processor 100, the storage device 101, the input device 102, the output device 103, and the communication IF 104 are connected to each other through a bus 105. FIG. 3 mainly shows a configuration to realize the calculation unit 11 of the object recognition device 1. However, an input/output interface (not shown) to realize the image acquisition unit 12 and the output unit 13 can be further provided in addition to the configuration shown in FIG. 3.

The processor 100 generally controls the object recognition device 1. The processor 100 executes an object recognition processing program P1 stored in the storage device 101 to realize each functional unit of the calculation unit 11 shown in FIG. 1.

The storage device 101 serves as a work area of the processor 100. The storage device 101 stores the object recognition processing program P1, image data, and the like. The storage device 101 realizes the data holding unit 113. Data acquired through the communication IF 104 is temporarily stored in the storage device 101. The storage device 101 includes, for example, a ROM (Read Only Memory), a RAM (Random Access Memory), an HDD (Hard Disk Drive), a flash memory, or the like.

The input device 102 is a device to input data. The input device 102 includes, for example, a keyboard, a mouse, a touch panel, a numeric keypad, a scanner, a voice recognition device, or the like. The output device 103 is a device to output data. The output device 103 includes, for example, a display, a printer, a voice synthesizing device, or the like.

Figure 4:
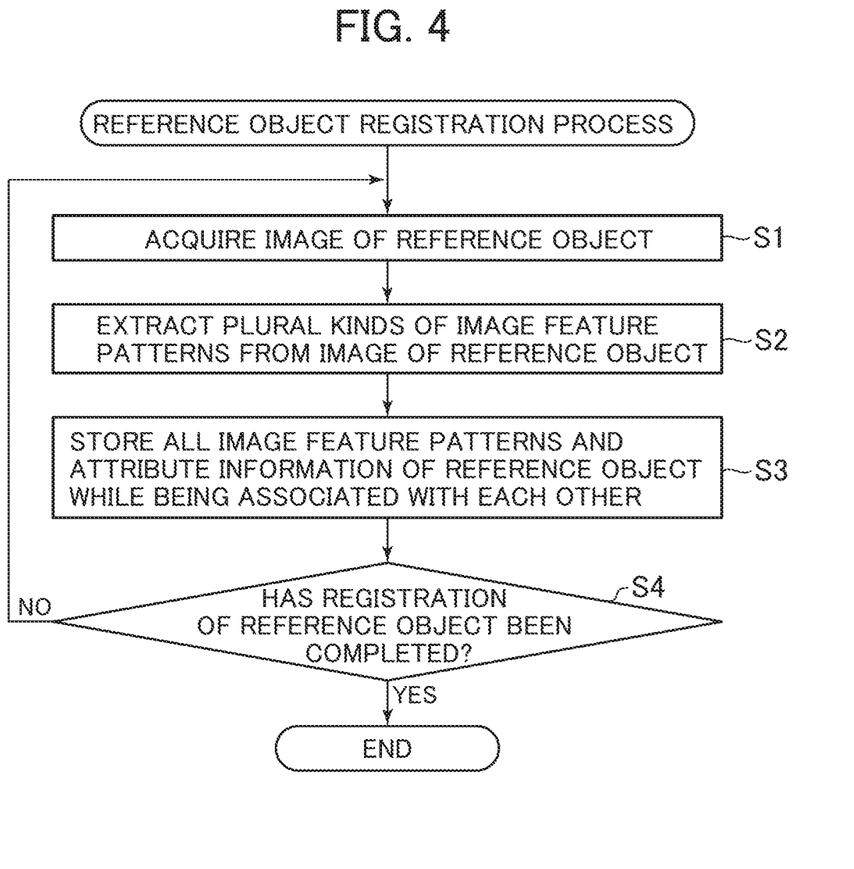
FIG. 4 is a flowchart of a reference object registration process.

FIG. 4 is a flowchart of a process (reference object registration process) in which a reference object is registered in the object recognition device 1. For example, an operator places a reference object to be registered within the field of view of the camera 10, and allows the camera 10 to photograph the reference object. An image (image data) photographed by the camera 10 is acquired by the image acquisition unit 12, and is stored in the data holding unit 113 (S1).

The feature acquisition unit 114 of the object recognition device 1 extracts an image feature pattern corresponding to a feature point and each of plural kinds of feature quantities at the feature point from the image data of the reference object (S2), and stores all the extracted image feature patterns into the data holding unit 113 while being associated with attribute information of the reference object (S3). The attribute information of the reference object includes, for example, the item number, the serial number, the manufacturer, the type of feature quantity, or the like of the reference object.

The object recognition device 1 determines whether or not the registration process for the reference object has been completed (S4). For example, when an operator instructs to complete the registration work using the input device 102, the object recognition device 1 determines that the registration process for the reference object has been completed, and terminates the process (S4: YES).

As described above, the image feature pattern corresponding to each of plural kinds of feature quantities at a feature point that can be acquired from image data obtained by imaging a reference object serving as a recognition candidate and attribute information of the reference object are held in advance into the data holding unit 113 while being associated with each other in the embodiment.

As the image feature pattern, for example, an image itself can be used. In this case, an image feature element corresponds to each pixel in the image. Alternatively, an edge acquired by edge detection such as the Canny edge detection may be used. In this case, the image feature element corresponds to each of the detected edges.

Figure 5:
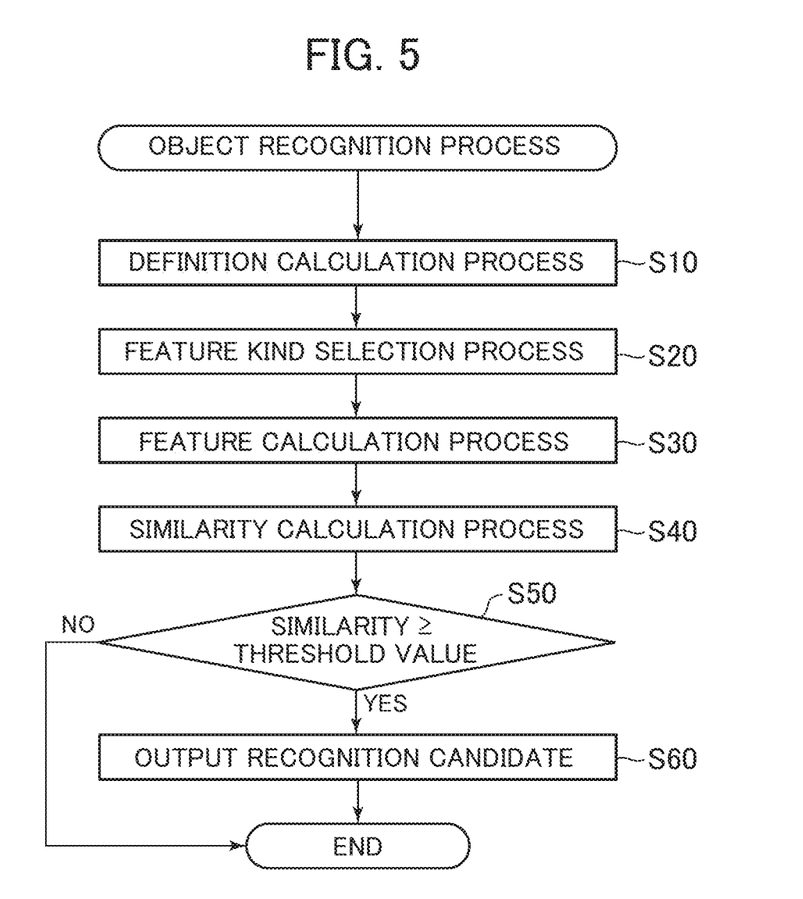
FIG. 5 is a flowchart of an object recognition process.

FIG. 5 is a flowchart for showing an object recognition process.

The definition calculation unit 111 calculates the definition of each unit region in the scene image acquired by the image acquisition unit 12 (S10).

Next, the feature selection unit 112 identifies that the scene image is anyone of a region (first region) in a range (first range) where the definition is high, a region (second region) in a range (second range) where the definition is medium, and a region (third region) in a range (third range) where the definition is low on the basis of the calculated definition of each unit region. The feature quantity used for the region where the definition is high is set as a feature quantity (for example, SIFT feature quantity: feature quantity for high definition: first feature quantity) that is high in expressing capability, the feature quantity used for the region where the definition is medium is set as a feature quantity (for example, LBP: feature quantity for medium definition: second feature quantity) that is high in the degree of robustness, and the feature quantity used for the region where the definition is low is set as a feature quantity (a three-dimensional coordinate position, a normal line, or the like: feature quantity for low definition: third feature quantity) that is not affected by illumination conditions (S20).

Next, the feature acquisition unit 114 extracts a feature point from the data of the scene image acquired by the image acquisition unit 12, and acquires (calculates) a feature quantity selected for each feature point (S30).

Next, the matching calculation unit 15 performs a process of matching feature points on the basis of the feature quantity and the feature point of the scene image acquired by the feature acquisition unit 114 and the feature quantity and the feature point of the model image of the data holding unit 113, and calculates the similarity between the scene image and the model image (S40). In the embodiment, the matching calculation unit 15 switches the feature quantity of the model image to be compared in accordance with the definition of a region to which the feature point of the scene image belongs. Specifically, the matching calculation unit 15 performs the process of matching the feature point in the region of the scene image where the definition is high with the feature point on the basis of the feature quantity for high definition for the model image, performs the process of matching the feature point in the region of the scene image where the definition is medium with the feature point on the basis of the feature quantity for medium definition for the model image, and performs the process of matching the feature point in the region of the scene image where the definition is low with the feature point on the basis of the feature quantity for low definition for the model image.

Next, the matching calculation unit 115 determines whether or not the calculated similarity is equal to or larger than a predetermined threshold value (S50). In the case where the result shows that the similarity is not equal to or not larger than the predetermined threshold value (S50: NO), it indicates that an object of the recognition candidate is not present in the scene image, and thus the matching calculation unit 115 directly terminates the process.

On the other hand, in the case where the similarity is equal to or larger than the predetermined threshold value (S50: YES), it indicates that an object of the recognition candidate is present in the scene image, and thus the matching calculation unit 115 outputs information indicating the object of the recognition candidate to the output unit 13. The output unit 13 receiving the output outputs the information indicating the object of the recognition candidate as a recognition result (S60), and terminates the process. The output of the recognition result can be displayed on a display, or can be given to a controller that operates a robot or a machine outside the drawing.

According to the embodiment configured as described above, an appropriate feature quantity can be detected in accordance with the definition of a region of the scene image, and an object can be appropriately recognized. Thus, even in the case where illumination or a shadow is reflected in the scene image, the object recognition device can appropriately recognize an object, and the recognition accuracy of an object can be improved irrespective of environments where the object recognition device is used.

Next, the object recognition process will be described using a concrete example.

Figure 6A:
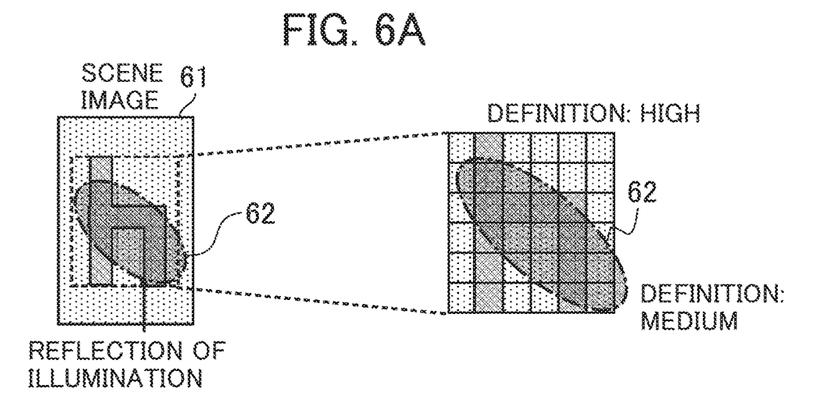
FIG. 6A is an explanatory diagram of a process for recognizing an object using feature quantities that differ in accordance with definition.
Figure 6B:
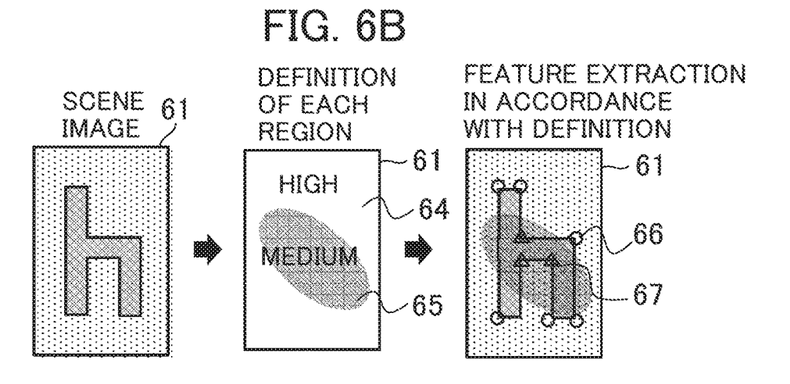
FIG. 6B is an explanatory diagram of a process for recognizing an object using feature quantities that differ in accordance with definition.
Figure 6C:
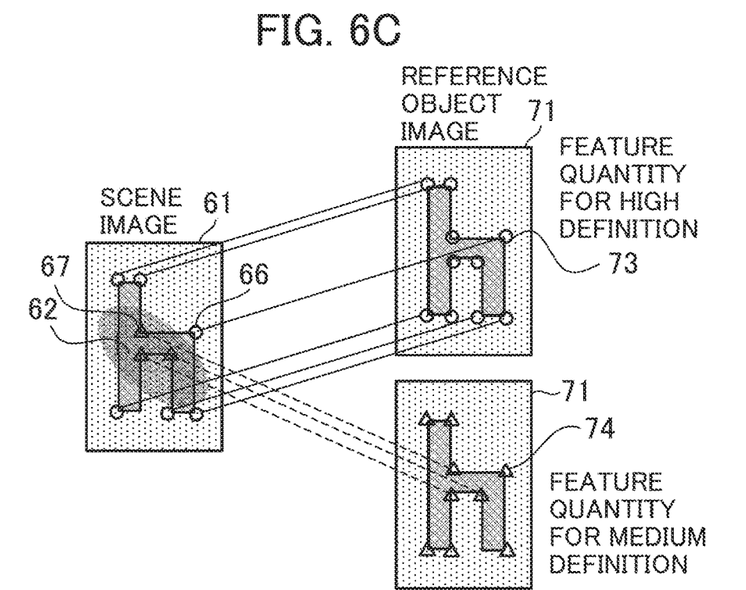
FIG. 6C is an explanatory diagram of a process for recognizing an object using feature quantities that differ in accordance with definition.

FIGS. 6A to 6C are explanatory diagrams of a process in which an object is recognized using a feature quantity that differs in accordance with definition.

As shown in FIG. 6A, it is assumed that a whitened reflection region 62 in which illumination is reflected is present in a scene image 61. The definition calculation unit 111 calculates the definition in the reflection region 62 as a value in a medium range for such a scene image 61, and calculates the definition in the other regions as a large value.

When the definition is calculated for the scene image 61 by the definition calculation unit 111, the scene image 61 is classified into a high-definition region 64 and a medium-definition definition region 65 as shown in FIG. 6B. In this case, the feature selection unit 112 selects the feature quantity for high definition to be used in the region 64, and selects the feature quantity for medium definition to be used in the region 65. As a result, the feature acquisition unit 114 calculates the feature quantity for high definition of a feature point in the case of the region 64, whereas the feature acquisition unit 114 calculates the feature quantity for medium definition of a feature point in the case of the region 65. As described above, the feature acquisition unit 114 can calculate an appropriate feature quantity in accordance with the definition of a region.

When the feature quantities and the feature values of the scene image 61 are acquired by the feature acquisition unit 114, the matching calculation unit 115 performs, as shown in FIG. 6C, a process of matching a feature point 67 for the reflection region 62 of the scene image 61 with a feature point 74 on the basis of the feature quantity for medium definition of a reference object image 71, and a process of matching a feature point 66 of a region other than the halation region 62 with a feature point 73 on the basis of the feature quantity for high definition of the reference object image 71. Accordingly, the matching process of the feature points can be performed between the scene image and the reference object image in accordance with the status of the definition of the scene image and on the basis of the feature quantity suitable for the definition, and the recognition accuracy by the matching process can be improved.

Second Embodiment

Next, a second embodiment will be described. It should be noted that differences from the first embodiment will be mainly described in each of the following embodiments including the second embodiment.

The embodiment will be described on the assumption that a scene image has a region (reflection region) with illumination or a shadow reflected, but has neither a complete halation region nor a black crushing region, and the reflection region is detected as a medium-definition region.

There is a possibility that wrong correspondence is included in the matching process in which the feature points having the closest feature quantity are associated with each other. Thus, the matching calculation unit 15 may improve the matching accuracy by executing the following processes (A2) to (C2) instead of the processes (A) to (C) in the first embodiment.

(A2) Among plural sets of the feature points (high-definition scene feature points) detected from the high-definition region in the scene image and the feature points of the model image that are associated with each other, several sets are randomly selected, and the transformation matrix shown in (1) is acquired on the basis of the selected sets.

(B2) All the model feature points are transformed by the transformation matrix obtained in (A2) to identify the corresponding position in the scene image for each model feature point. In the case where the model feature point makes a set with the high-definition scene feature point, a geometric distance (for example, two-dimensional distance) between the identified position and the position of the scene feature point that forms the set is calculated. In the case where the distance is equal to or smaller than a predetermined threshold value, the set of the model feature point and the scene feature point is determined as a correctly-associated set. On the other hand, in the case where the model feature point does not make a set with the high-definition scene feature point (for example, in the case where the model feature point makes a set with the medium-definition scene feature point) and in the case where a difference between the feature quantity for medium definition at the model feature point and the feature quantity for medium definition at the identified position of the scene image is equal to or smaller than a predetermined threshold value, the identified position is recognized as the scene feature point, and the set of the model feature point and the recognized scene feature point is determined as a correctly-associated set. Then, the number of correctly-associated sets is counted.

(C2) The transformation matrix acquired in the case where the number of correctly-associated sets is the largest by repeatedly executing the processes (A2) and (B2) is identified as the optimum transformation matrix. In addition, if the total number in the case where the number of correctly-associated sets is the largest is equal to or larger than a predetermined threshold value, it is determined that an object of the model image is present in the scene image (presence of object). If the total number is smaller than the threshold value, it is determined that an object of the model image is not present in the scene image (absence of object).

According to the second embodiment, even in the case where illumination or a shadow is reflected in the scene image, the object recognition device can appropriately recognize an object, and the recognition accuracy of an object can be improved irrespective of environments where the object recognition device is used.

Third Embodiment

Next, a third embodiment will be described.

The embodiment will be described on the assumption that illumination and a shadow are reflected and a complete halation region and a black crushing region (halation and black crushing regions) are present in a scene image, and these regions are detected as low-definition regions. In the halation and black crushing regions, the feature quantities such as SIFT and LBP cannot be detected.

In such a case, the matching calculation unit 15 may improve the matching accuracy by executing the following processes (A3) to (C3) instead of the processes (A) to (C) in the first embodiment.

(A3) Among plural sets of the feature points (high-definition scene feature points) detected from the high-definition region in the scene image and the feature points of the model image that are associated with each other, several sets are randomly selected, and the transformation matrix shown in (1) is acquired on the basis of the selected sets.

(B3) All the model feature points are transformed by the transformation matrix obtained in (A3) to identify the corresponding position in the scene image for each model feature point. In the case where the model feature point makes a set with the high-definition scene feature point, a three-dimensional geometric distance between the identified position and the position of the scene feature point that forms the set is calculated. In the case where the three-dimensional geometric distance is equal to or smaller than a predetermined threshold value, the set of the model feature point and the scene feature point is determined as a correctly-associated set. On the other hand, in the case where the identified position is located in the halation and black crushing regions, a three-dimensional geometric distance between the identified position and a point (nearest point) located at the position nearest to the identified position in a point group of the scene image is identified. In the case where the difference from the three-dimensional geometric distance is equal to or smaller than a predetermined threshold value, the nearest point is recognized as the scene feature point, and the set of the model feature point and the recognized scene feature point is determined as a correctly-associated set. Then, the number of correctly-associated sets is counted.

(C3) The transformation matrix acquired in the case where the number of correctly-associated sets is the largest by repeatedly executing the processes (A3) and (B3) is identified as the optimum transformation matrix. In addition, if the total number in the case where the number of correctly-associated sets is the largest is equal to or larger than a predetermined threshold value, it is determined that an object of the model image is present in the scene image (presence of object). If the total number is smaller than the threshold value, it is determined that an object of the model image is not present in the scene image (absence of object).

According to the third embodiment, even in the case where the halation and black crushing regions where some types of feature quantities cannot be acquired are present, the object recognition device can identify a feature point in the regions, and can appropriately recognize an object. In addition, the recognition accuracy of an object can be improved irrespective of environments where the object recognition device is used.

Fourth Embodiment

Next, a fourth embodiment will be described.

The matching calculation unit 15 may improve the matching accuracy by executing the following processes (A4) to (C4) instead of the processes (A) to (C) in the first embodiment. It should be noted that the processes (A) to (C) and the processes (A4) to (C4) may be executed while being switched to each other in accordance with a status.

(A4) Among plural sets of the feature points (scene feature points) detected from the scene image and the feature points of the model image that are associated with each other, several sets are randomly selected, and the transformation matrix shown in (1) is acquired on the basis of the selected sets. It should be noted that all the feature points may be detected from the scene image by the same feature point extraction method, or may be detected by feature point extraction methods that are different from each other in accordance with the definition.

(B4) All the model feature points are transformed by the transformation matrix obtained in (A4) to identify the corresponding position in the scene image for each model feature point, and a geometric distance between the identified corresponding position and the position of the scene feature point that makes a set is calculated. In the case where the distance is equal to or smaller than a predetermined threshold value, the set of the model feature point and the scene feature point is determined as a correctly-associated set. Then, the sum of the scene feature points of the correctly-associated sets or the definition around the points is calculated.

(C4) The transformation matrix acquired in the case where the sum of the definition of the correctly-associated sets is the largest by repeatedly executing the processes (A4) and (B4) is identified as the optimum transformation matrix. In addition, if the maximum number of the sum of the definition of the correctly-associated sets is equal to or larger than a predetermined threshold value, it is determined that an object of the model image is present in the scene image (presence of object). If the maximum number is smaller than the threshold value, it is determined that an object of the model image is not present in the scene image (absence of object).

According to the fourth embodiment, an object can be recognized by focusing on that high-definition feature points are correctly associated, and the recognition accuracy of an object can be improved.

Fifth Embodiment

Next, a fifth embodiment will be described.

The matching calculation unit 15 may improve the matching accuracy by executing the following processes (A5) to (C5) instead of the processes (A) to (C) in the first embodiment. It should be noted that the processes (A) to (C) and the processes (A5) to (C5) may be executed while being switched to each other in accordance with a status.

(A5) Among plural sets of the feature points (scene feature points) detected from the scene image and the feature points of the model image that are associated with each other, several sets are selected on the basis of a selection probability weighted by the scene feature point and the definition therearound, and the transformation matrix shown in (1) is acquired on the basis of the selected sets. Here, since the sets are selected on the basis of the selection probability weighted by the scene feature point and the definition therearound, a set including a scene feature point with higher definition can be more easily selected. Here, in order to easily execute the process with no difficulty even in the case of a scene image in which the definition is generally low, not only a set including a scene feature point with high definition but also a set including a scene feature point with another kind of definition is possibly selected.

(B5) All the model feature points are transformed by the transformation matrix obtained in (A5) to identify the corresponding position in the scene image for each model feature point, and a geometric distance between the identified corresponding position and the position of the scene feature point that makes a set is calculated. In the case where the distance is equal to or smaller than a predetermined threshold value, the set of the model feature point and the scene feature point is determined as a correctly-associated set. Then, the number of correctly-associated sets is counted.

(C5) The transformation matrix acquired in the case where the number of correctly-associated sets is the largest by repeatedly executing the processes (A5) and (B5) is identified as the optimum transformation matrix. In addition, if the total number in the case where the number of correctly-associated sets is the largest is equal to or larger than a predetermined threshold value, it is determined that an object of the model image is present in the scene image (presence of object). If the total number is smaller than the threshold value, it is determined that an object of the model image is not present in the scene image (absence of object).

According to the fifth embodiment, the feature points are associated by focusing on that high-definition feature points are correctly associated, and thus the recognition accuracy of an object can be improved.

It should be noted that the present invention is not limited to the above-described embodiments, and includes various modified examples. For example, the embodiments have been described in detail to easily understand the present invention, and are not necessarily limited to those including all the configurations described above. In addition, some configurations of an embodiment can be replaced by a configuration of another embodiment. In addition, a configuration of an embodiment can be added to a configuration of another embodiment. In addition, some configurations of an embodiment can be added to, deleted from, and replaced by other configurations.

In addition, some or all of the above-described configurations, functions, processing units, processing means, and the like may be realized using hardware by designing with, for example, integrated circuits. In addition, each of the above-described configurations, functions, and the like may be realized using software in such a manner that a processor interprets and executes a program realizing each function.

For example, the scene image is classified into any one of three kinds of definition such as high definition, medium definition, and low definition on the basis of the definition of each unit region in each embodiment. However, the present invention is not limited to this. The scene image may be classified into two kinds of definition such as high definition and low definition, or four or more kinds of definition on the basis of the definition.

In addition, the feature quantity to be selected is switched on the basis of the definition of each unit region in the first embodiment. However, the present invention is not limited to this. For example, in the case where the feature point extraction method is switched on the basis of the definition of each unit region, the feature quantity for each of the extracted feature points may be considered as the same kind of feature quantity. In this case, a feature point can be appropriately detected in accordance with each definition, and the matching process of the feature point can be accordingly performed with a high degree of accuracy.

Information of a program, a table, a file, and the like realizing each function can be stored in a storage device such as a memory, a hard disk, or an SSD (Solid State Drive), or a recording medium such as an IC card, an SD card, or a DVD.

In addition, the control lines and the information lines considered to be necessary in the explanation are shown, but all the control lines and the information lines that need to be mounted are not necessarily shown. In practice, almost all the configurations may be considered to be connected to each other.

Each constitutional element of the present invention can be arbitrarily selected, and the invention provided with the selected configuration is also included in the present invention. Further, the configurations described in Claims can be combined other than the combinations demonstrated in Claims.

What is claimed is:

1. An object recognition device for recognizing an object, the device comprising:
    a memory that stores a reference image of an object of a recognition candidate, each feature point in the reference image, and a feature quantity at each feature point;
    a camera that acquires a scene image that is an image of a recognition processing target; and
    a processor communicatively coupled to the memory and the camera, wherein the processor is configured to:
    detect a definition indicating a degree of sharpness in each region of the scene image acquired,
    detect a feature point in the scene image to perform a process of matching with the feature point,
    execute, by different methods, at least one of an extraction method of feature points in a first region of the scene image where the definition is a first range and in a second region of the scene image where the definition is a second range lower than the first range and a detection method of feature quantities in the first region and the second region,
    wherein the memory stores a first feature quantity that is high in expressing capability and a second feature quantity that is high in a degree of robustness for each feature point of the reference image,
    wherein the processor performs a matching process of a feature point using the first feature quantity for the first region of the scene image and performs a matching process of a feature point using the second feature quantity for the second region,
    wherein the memory stores a third feature quantity indicating a three-dimensional position information of an image for each region of the reference image, and
    wherein the processor performs a process of matching with a feature point of the reference image using the third feature quantity for a third region of the scene image of which the definition is a third range lower than the second range.

2. The object recognition device according to claim 1, wherein the first feature quantity is an SIFT (Scale Invariant Feature Transform) feature quantity, and
    wherein the second feature quantity is a local binary pattern.

3. The object recognition device according to claim 1, wherein the definition is a value based on at least any one of:
    the magnitude of a luminance gradient in a pixel configuring a unit region or the maximum unique value of the Hessian matrix;
    luminance distribution or standard deviation in the unit region;
    spatial frequency distribution obtained by performing two-dimensional Fourier transformation for the unit region; and
    the number of feature points detected by a predetermined feature point detection method in the unit region.

4. The object recognition device according to claim 1, wherein the processor detects a feature point in the first region of the scene image by a first feature point extraction method using SIFT for the reference image, and detects a feature point in the second region of the scene image by a second feature point extraction method different from the first feature point extraction method.

5. The object recognition device according to claim 1, wherein the processor performs the following processes (A2) to (C2):
    (A2) on the basis of some sets arbitrarily selected among plural sets of feature points in the first region of the scene image and feature points of the reference image serving as candidates associated therewith, a candidate transformation matrix showing a relation between the position of the feature point of the reference image and the position of the feature point of the scene image is calculated;

(B2) on the basis of the candidate transformation matrix, a corresponding position that is the position of the scene image corresponding to the position of the feature point of the reference image is identified; in the case where the corresponding position is a position belonging to the first region of the scene image and in the case where a geometric distance between the corresponding position and the position of the feature point of the scene image that makes a set with the feature point of the reference image is equal to or smaller than a predetermined threshold value, the set of these points is determined as a correctly-associated set; in the case where the corresponding position is a position belonging to the second region of the scene image and in the case where a difference between the second feature quantity at the feature point of the reference image and the second feature quantity at the corresponding position is equal to or smaller than a predetermined threshold value, the corresponding position is recognized as a feature point of the scene image, and the of correctly-associated feature points is measured; and (C2) a candidate transformation matrix where the total number of sets of correctly-associated feature points is the largest by repeatedly executing the processes (A2) and (B2) is determined as a transformation matrix in the reference image and the scene image.

6. The object recognition device according to claim 1, wherein the processor performs the following processes (A3) to (C3):

(A3) on the basis of some sets arbitrarily selected among plural sets of feature points in the first region of the scene image and feature points of the reference image serving as candidates associated therewith, a candidate transformation matrix showing a relation between the position of the feature point of the reference image and the position of the feature point of the scene image is calculated;

(B3) on the basis of the candidate transformation matrix, a corresponding position that is the position of the scene image corresponding to the position of the feature point of the reference image is identified; in the case where the corresponding position is a position belonging to the first region of the scene image and in the case where a three-dimensional geometric distance between the corresponding position and the position of the feature point of the scene image that makes a set with the feature point of the reference image is equal to or smaller than a predetermined threshold value, the set of these points is determined as a correctly-associated set; in the case where the corresponding position is a position belonging to the second region of the scene image and in the case where a three-dimensional geometric distance between the corresponding position and the nearest point that is the point nearest to the position in a point group of the scene image is equal to or smaller than a predetermined threshold value, the nearest point is recognized as a feature point of the scene image, and the set of these points is determined as a correctly-associated set; and the number of sets of correctly-associated feature points is measured; and (C3) a candidate transformation matrix where the total number of sets of correctly-associated feature points is the largest by repeatedly executing the processes (A3) and (B3) is determined as a transformation matrix in the reference image and the scene image.

7. The object recognition device according to claim 1, wherein the processor performs the following processes (A4) to (C4):

(A4) on the basis of some sets arbitrarily selected among plural sets of feature points in the first region of the scene image and feature points of the reference image serving as candidates associated therewith, a candidate transformation matrix showing a relation between the position of the feature point of the reference image and the position of the feature point of the scene image is calculated;

(B4) on the basis of the candidate transformation matrix, a corresponding position that is the position of the scene image corresponding to the position of the feature point of the reference image is identified; in the case where the corresponding position is a position belonging to the first region of the scene image and in the case where a three-dimensional geometric distance between the corresponding position and the position of the feature point of the scene image that makes a set with the reference image is equal to or smaller than a predetermined threshold value, the set of these points is determined as a correctly-associated set; in the case where the corresponding position is a position belonging to the second region of the scene image and in the case where a three-dimensional geometric distance between the corresponding position and the position of the feature point of the scene image that makes a set with the reference image is equal to or smaller than a predetermined threshold value, the set of these points is determined as a correctly-associated set; and the sum of the feature points of the scene image having the sets of correctly-associated feature points or definition around the points is measured; and (C4) a candidate transformation matrix where the sum of the feature points of the scene image having the sets of correctly-associated feature points or definition around the points is the largest by repeatedly executing the processes (A4) and (B4) is determined as a transformation matrix in the reference image and the scene image.

8. The object recognition device according to claim 1, wherein the processor performs the following processes (A5) to (C5):

(A5) on the basis of some sets selected on the basis of a selection probability weighted by a scene feature point or definition therearound among plural sets of feature points in the first region of the scene image and feature points of the reference image serving as candidates associated therewith, a candidate transformation matrix showing a relation between the position of the feature point of the reference image and the position of the feature point of the scene image is calculated;

(B5) on the basis of the candidate transformation matrix, a corresponding position that is the position of the scene image corresponding to the position of the feature point of the reference image is identified; in the case where the corresponding position is a position belonging to the first region of the scene image and in the case where a three-dimensional geometric distance between the corresponding position and the position of the feature point of the scene image that makes a set with the feature point of the reference image is equal to or smaller than a predetermined threshold value, the set of these points is determined as a correctly-associated set; in the case where the corresponding position is a position belonging to the second region of the scene image and in the case where a three-dimensional geometric distance between the corresponding position and the position of the feature point of the scene image that makes a set with the feature point of the reference image is equal to or smaller than a predetermined threshold value, the set of these points is determined as a correctly-associated set; and the number of sets of correctly-associated feature points is measured; and (C5) a candidate transformation matrix where the total number of sets of correctly-associated feature points is the largest by repeatedly executing the processes (A5) and (B5) is determined as a transformation matrix in the reference image and the scene image.

9. An object recognition method by an object recognition device for recognizing an object, comprising the steps of:

allowing a memory to store a reference image of an object of a recognition candidate, each feature point in the reference image, and a feature quantity at each feature point;

acquiring a scene image that is an image of a recognition processing target;

detecting, via a processor, a definition indicating a degree of sharpness in each region of the acquired scene image;

detecting, via the processor, a feature point in the scene image to perform a process of matching with the feature point, executing, via the processor, by different methods, in the detection of the feature point and the process of matching with the feature point, at least one of an extraction method of feature points in a first region of the scene image where the definition is a first range and in a second region of the scene image where the definition is a second range lower than the first range, and a detection method of feature quantities in the first region and the second region, storing, in the memory, a first feature quantity that is high in expressing capability and a second feature quantity that is high in a degree of robustness for each feature point of the reference image, performing, via the processor, a matching process of a feature point using the first feature quantity for the first region of the scene image and performs a matching process of a feature point using the second feature quantity for the second region, storing, in the memory, a third feature quantity indicating a three-dimensional position information of an image for each region of the reference image, and performing, via the processor, a process of matching with a feature point of the reference image using the third feature quantity for a third region of the scene image of which the definition is a third range lower than the second range.

* * * * *